Feb. 24, 1942. E. E. SAWYER 2,274,095
RESIN-BEARING MOLDED PULP ARTICLE
Filed July 25, 1938

Inventor:
Edward E. Sawyer
By Spear, Rawlings & Spear
Attorneys.

Patented Feb. 24, 1942

2,274,095

UNITED STATES PATENT OFFICE 2,274,095

RESIN-BEARING MOLDED PULP ARTICLE

Edward E. Sawyer, Waterville, Maine, assignor to Keyes Fibre Company, Waterville, Maine, a corporation of Maine Application July 25, 1938, Serial No. 221,112

2 Claims. (Cl. 229—2.5)

This invention relates to the manufacture of multilayer resin-bearing fibrous articles, individually foraminous-die molded from aqueous pulp mixtures.

At least one of the article layers, preferably a surface layer, is a fibrous layer which is rich in resin. The other layer or layers composing the major thickness or body of the article are fibrous layers, which in certain instances may contain some resin.

The several article layers are suction or pressure formed to approximately the shape and size of the desired finished article on a foraminous die or dies and are then dried and thereafter consolidated with and bonded to each other in any desired order of arrangement between complemental imperforate finishing dies of the shape and size of the required finished article.

This consolidating and bonding step is performed under sufficient heat and pressure to compact the fibrous structure of the several layers or pre-forms, the resin contained in the resin-bearing surface layer or layers furnishing an adhesive bond which firmly unites the contacting surface of the resin-bearing layer to an adjacent body layer, as well as furnishing a high finish to the exposed surface of the resin-bearing layer which is hard, substantially insoluble and infusible, and is effectively resistant to moisture, grease, oil and the like. Also, due to its fibrous structure and the fact that it is molded to shape, said resin-bearing surface layer is of substantially uniform thickness and is substantially non-cracking, peeling or chipping. This layer is preferably thin so as to reduce to the minimum the use of the expensive resinous materials and still obtain the properties above described.

The body layer or layers which compose the bulk or major thickness of the article may be made from relatively inexpensive fibrous material containing little or no resin. Due to the fact that these body layers are suction or pressure formed on a foraminous die or dies to approximately the finished shape of the desired article and are dried to this shape, the fibres in the final article remain substantially in their original formed and interfelted positions except that they are compacted by the pressure of the finishing dies. There is, therefore, the minimum distortion or rearrangement of the fibres or weakening of the fibrous structure. Consequently the fibrous structure of this body layer or layers gives to the final article greater impact strength with rigidity in an article of thick section, and greater impact strength with unusual flexibility, without fracture, in an article of thin section, as compared with articles of equivalent shape and section made by conventional methods from conventional resin-bearing molding compounds.

My articles are especially adapted for use as serving trays and the like, containers, and other articles which may be subject to abuse and hence either require greater impact strength with rigidity or impact strength and unusual flexibility, without fracture, beyond that which may be obtained in similar articles manufactured from common commercial resin-bearing molding compounds.

My process of manufacturing my articles is especially adapted for their economical commercial production on existing commercial equipment.

For purposes of illustration I have shown in the accompanying drawing an article of conventional dish shaped design consisting of a resin-bearing fibrous surface or lining layer and a fibrous body or backing layer. My article, however, may be molded and finished to any desired shape and may consist of any desired number and combination of the fibrous and resin-bearing layers, for example, the article may consist of three or more layers of which the outer layers only are the resin-bearing fibrous layers, or the inner layers may contain a small percentage of resin, and the outer layers may be rich in resin.

Figure 1:
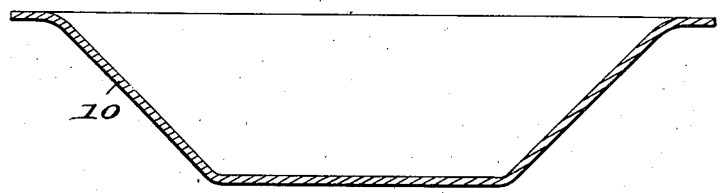
Fig. 1 is a section through the resin-bearing fibrous layer or preform of my article.

The resin-bearing lining or surface layer 10 illustrated in Fig. 1 is suction or pressure formed on a foraminous molding die from an aqueous pulp mixture consisting of cellulosic or other fibrous material to which has been added and intimately mixed in powdered form a suitable uncured synthetic resin of the thermo-setting or thermo-plastic type. The molding die corresponds substantially in size and shape to the size and shape of the final article.

After being formed to the required thickness on the molding die, the layer 10 is drained of its surplus water content and dried at a temperature sufficiently low so that the chemical composition of the resin remains substantially unchanged. In this condition the resin is uniformly distributed throughout the dry fibrous mass.

Figure 2:
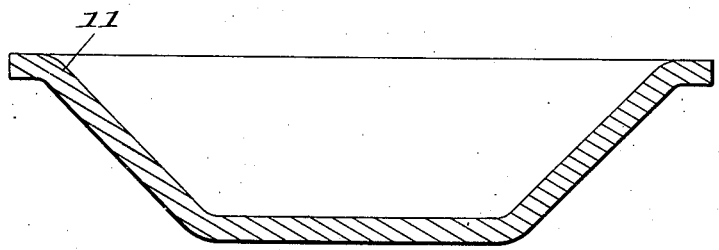
Fig. 2 is a section through the fibrous body layer or pre-form with which the resin-bearing fibrous layer or layers is combined, finished and bonded under heat and pressure to produce the finished article shown in Fig. 4.

The body layer 11 of Fig. 2 is likewise suction or pressure formed on a foraminous molding die to substantially the size and shape of the final article from an aqueous pulp mixture which may be composed entirely of pulp fibres or of pulp fibres and any desired organic or inorganic filler. If desired I may add to the pulp mixture a percentage of resin to improve the bonding action and increase the rigidity of the finished article. The molding die on which the body layer 11 is formed corresponds approximately in size and shape to that of the finished article and is complemental to the molding die on which the layer 10 is formed.

After being formed to the required thickness, the body layer 11 is drained of its surplus water content and dried. If any resin has been included in the structure of the body layer, the drying is done at a temperature sufficiently low so that the chemical composition of the resin remains substantially unchanged.

In their dried condition, as pre-forms, both the body layer and the lining layer are complemental in shape to each other and closely approximate the shape of the required finished article. They are then ready for the consolidation, bonding and finishing as a composite article.

Figure 3:
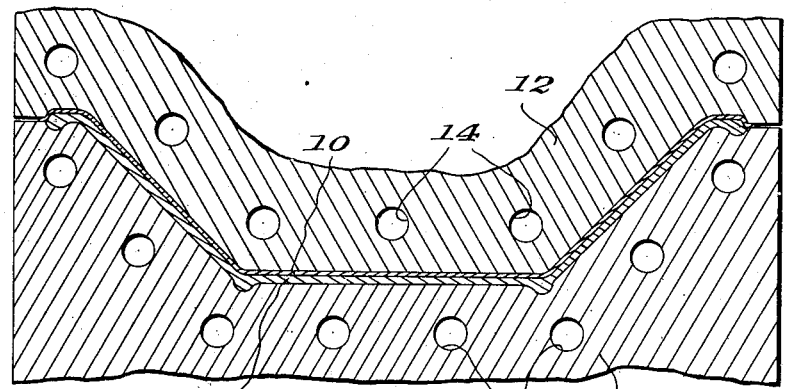
Fig. 3 is a section through a pair of complemental finishing dies for imparting the final shape to the article, and between which are the dried pre-forms combined in superimposed order, and compacted, finished, and bonded under heat and pressure.

In carrying out this finishing operation, the dried pre-forms are placed in desired superimposed order between a pair of imperforate finishing dies 12 and 13 (see Fig. 3) of the size and shape desired for the finished article, this being substantially the same size and shape as said pre-forms. The dies are closed on the pre-forms under sufficient pressure to compact and consolidate both layers and are supplied with sufficient heat to melt the finely divided resin particles into a continuous phase of resin distributed in and around the framework of fibres in the resin-bearing layer or layers. One or both of the dies may be heated in any desired manner, as by providing steam passages 14 and 15 in the die bodies.

Figures 4, 5:
Fig. 4 is an enlarged fragmentary cross section through the finished article.
Fig. 5 is a greatly enlarged fragmentary section through the finished article, particularly showing the adhesive bond between the contacting surfaces of the resin-bearing and non-resinous layers which is furnished by the cured resin in the resin-bearing layer.

During the period required for curing the resin in the resin-bearing layer or layers, sufficient pressure is maintained on the dies to compact the article layers to the desired sectional structure. As a result of such heat and pressure the surface of the resin-bearing layer which lies adjacent to the die 12 attains a smooth ironed or glossy finish. The resin of the resin-bearing layer 10 is forced into and cured in intimate interlocking contact with the fibres of the body layer 11, forming a strong adhesive bond, indicated diagrammatically at 16 in Fig. 5, between the contacting surfaces of said layers. This bond is uniform throughout the entire area of surface contact of said layers.

Thus the finished article has the appearance and finish as to its resin-bearing layer 10 of a solid resinous article, without however, requiring the use of a large amount of this expensive resinous material. The finished article has superior impact strength due to the reinforcement afforded by the fibrous structure. It is also superior in its ability to withstand reasonable flexing without checking or breaking, which is particularly important in articles which have very thin wall sections or are of intricate shape and which when molded by conventional methods and from conventional resin-bearing molding compositions are fragile and easily broken.

By molding the individual pre-forms to substantially fit the finishing dies, the only physical change which takes place in the pre-forms when pressure and heat is applied is the reduction of their sectional thickness or the increase in sectional density so that the natural strength obtained by interfelting the fibres on the molding dies is increased, and there is no distortion, breaking, folding or similar disruption caused by rearrangement of the fibres which would give the article an uneven fibrous structure and a poor surface finish.

If desired, the faces of the finishing dies may carry an embossed or patterned design, or may have grooves in order to form strengthening ribs in the finished article.

Figure 6:
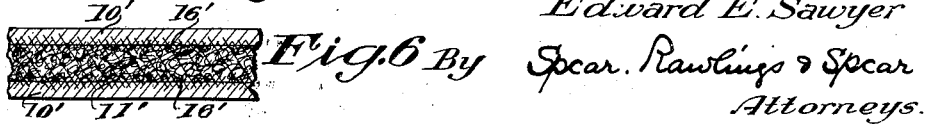
Fig. 6 is a similar section through a three-layer finished article.

Although the article illustrated in Figs. 1 to 5 inclusive is a two-layer article, if it is desirable to have the resin-bearing surface and finish over the entire article, I may use a resin-bearing layer 10' on both sides of the fibrous body layer 11' (see Fig. 6), the contacting surfaces of the several layers being united to each other as diagrammatically indicated at 16' with bonds furnished by the cured resin of the resin-bearing layers. In addition to furnishing the resinous finish over the entire surface of the article, such a three-layer article has the advantage of the fibrous core or inner layer 11' in respect to bulk, impact strength, and cheapness.

By the term "substantially smooth ironed surface" as used herein is meant a surface which as a result of the curing or finishing operation is not appreciably rough or irregular, even though it may exhibit a deliberate pattern or decorative design embossed therein.

By the term "aqueous pulp mixtures" as used herein is meant mixtures which in the case of the fibrous body layer or layers 11 may include organic or inorganic fillers such as wood-flour, talc, asbestine, clay, etc. or even a percentage of resin, and in the case of the resin-bearing fibrous layer or layers 10 may include any desired type of thermo-setting or thermo-plastic resin.

While I have described a formation method in which the several layers are independently formed on independent molding dies, I may however, use a single molding die and successively immerse the same in the several aqueous pulp mixtures for the several layers of the article whereby to form said layers in superimposed order and to the required thickness on said die as a composite article which is afterwards dried as a preform to substantially the shape of the finished article in any suitable manner.

However formed, the wet article layer or layers, may be dried on the molding die or dies, or may be removed from said die or dies and dried on a third die of complemental shape to the molding die, or the wet preforms may be removed from the molding die or dies and dried in a heated oven or the like.

The percentage of fibres to resin in the several layers may vary according to the characteristics wanted in the final article and according to the particular kind of fibres and type of resin employed and to meet the special requirements to which the finished article may be subjected in service. Various other modifications in methods and materials may be resorted to within the spirit and scope of my invention as defined by the appended claims.

What I therefore claim and desire to secure by Letters Patent is:

1. An individual multilayer molded fibrous article of dished shape, comprising a plurality of superimposed preformed resin-bearing fibrous layers of complemental size and shape, die-molded from different aqueous pulp mixtures containing fibres and uncured synthetic resin, and compacted and finished under heat and pressure, one of said layers being a body layer comprising a substantial amount of interfelted fibres and a cured synthetic resin distributed substantially uniformly throughout said layer, and another of said layers being a finishing layer comprising interfelted fibres and a substantial amount of cured synthetic resin distributed substantially uniformly throughout said layer, the proportionate amount of resin to fibre in said finishing layer being appreciably greater than the proportionate amount of resin to fibre in said body layer, the fibrous structure of said layers being substantially unchanged, except for compacting, from their original die-molded shape and presenting an article substantially free from wrinkles, folds, or breaks in its structure, and the cured resin of the finishing layer giving a hard, smooth, enamel-like finish to the exposed surface of said layer and with the cured resin of said body layer furnishing a bond between the contacting surfaces of said layers.

2. An individual multi-layer molded fibrous pulp article of dished shape, comprising a plurality of super-imposed pre-formed resin bearing fibrous layers of complemental size and shape di-molded from different aqueous pulp mixtures containing fibres and uncured synthetic resin and compacted and finished under heat and pressure, one of said layers being a core layer comprising a substantial amount of interfelted fibres and a cured synthetic resin distributed substantially uniformly throughout said layer, and two other layers being finishing layers, each comprising interfelted fibres and a substantial amount of cured synthetic resin distributed substantially uniformly throughout said layer, the proportionate amount of resin to fibre in each finishing layer being appreciably greater than the proportionate amount of resin to fibre in said core layer, the fibrous structure of said layers being substantially unchanged, except for compacting, from their original di-molded shape and presenting an article substantially free from defects caused by wrinkles, folds, or breaks in its structure, and the cured resin of the finishing layers giving a hard, smooth, enamel-like finish to the exposed surfaces of said layers and with the cured resin of said core layer furnishing a bond between the contacting surfaces of said layers.

EDWARD E. SAWYER.